(12) United States Patent
Wang et al.

(10) Patent No.: US 12,536,063 B2
(45) Date of Patent: Jan. 27, 2026

(54) SELF-CORRECTING CIRCUIT AND SIGNAL SELF-CORRECTING METHOD

(71) Applicant: Suzhou Metabrain Intelligent Technology Co., Ltd., Jiangsu (CN)

(72) Inventors: Xu Wang, Jiangsu (CN); Jie Liu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 42 days.

(21) Appl. No.: 18/571,906

(22) PCT Filed: Mar. 29, 2022

(86) PCT No.: PCT/CN2022/083571
§ 371 (c)(1),
(2) Date: Dec. 19, 2023

(87) PCT Pub. No.: WO2023/092920
PCT Pub. Date: Jun. 1, 2023

(65) Prior Publication Data
US 2024/0281320 A1 Aug. 22, 2024

(30) Foreign Application Priority Data
Nov. 26, 2021 (CN) .......................... 202111416834.7

(51) Int. Cl.
*G06F 11/07* (2006.01)
(52) U.S. Cl.
CPC ...... *G06F 11/0793* (2013.01); *G06F 11/0745* (2013.01)
(58) Field of Classification Search
CPC ............. G06F 11/0745; G06F 11/0793; G06F 13/4072; G06F 2213/0002
See application file for complete search history.

(56) References Cited

U.S. PATENT DOCUMENTS 4,667,249 A * 5/1987 Owada ................. H04N 1/403
382/254
6,270,381 B1 8/2001 Adriaenssens et al.
(Continued)

FOREIGN PATENT DOCUMENTS

CN 1933465 A 3/2007
CN 107483044 A 12/2017
(Continued)

OTHER PUBLICATIONS

Corresponding International Patent Application No. (PCT/CN2022/083571), International Search Report, date mailed May 27, 2022.
(Continued)

*Primary Examiner* — Albert Decady
*Assistant Examiner* — Enamul M Kabir
(74) *Attorney, Agent, or Firm* — Cooper Legal Group, LLC

(57) ABSTRACT

The present application relates to a technical field of signal transmission, in particular, to a self-correcting circuit and a signal self-correcting method. The circuit includes a calculation unit, a correcting unit, and a first transistor; an output end of the calculation unit is connected to an input end of the correcting unit; an output end of the correcting unit is connected to the first transistor; the calculation unit is configured to calculate a voltage difference between a P signal and an N signal; and the correcting unit is configured to correct, according to the voltage difference, an interference signal corresponding to the N signal, control the first transistor to be turned on, and output the corrected N signal through the first transistor.

15 Claims, 4 Drawing Sheets

(56) References Cited

U.S. PATENT DOCUMENTS

| | | | |
|---|---|---|---|
| 7,501,859 B1 | 3/2009 | Ohannes | |
| 2001/0045805 A1* | 11/2001 | Shibata | H04N 3/233 |
| | | | 348/E3.044 |
| 2011/0019039 A1* | 1/2011 | Ikuma | H04N 25/616 |
| | | | 348/E9.037 |
| 2011/0148202 A1* | 6/2011 | Rada | G05F 1/70 |
| | | | 307/105 |
| 2015/0204918 A1 | 7/2015 | Chen et al. | |
| 2015/0317940 A1* | 11/2015 | Zheng | G09G 3/3648 |
| | | | 345/208 |
| 2018/0313872 A1* | 11/2018 | Peschke | G01R 35/007 |

FOREIGN PATENT DOCUMENTS

| | | |
|---|---|---|
| CN | 109308391 A | 2/2019 |
| CN | 111551777 A | 8/2020 |
| CN | 111817701 A | 10/2020 |
| CN | 112567463 A | 3/2021 |
| CN | 113836071 A | 12/2021 |
| JP | 2010039969 A | 2/2010 |

OTHER PUBLICATIONS

Corresponding International Patent Application No. (PCT/CN2022/083571), Written Opinion, date mailed May 27, 2022.
Corresponding Chinese Patent Application No. CN202111416834.7, First Office Action, dated Jan. 6, 2022.
Corresponding Chinese Patent Application No. CN202111416834.7, Notification of Grant, dated Jan. 24, 2022.
Xing Deng, "Analysis of current sensors' electromagnetic susceptibility and improvement method", A Master Dissertation Submitted toUniversity of Electronic Science and Technology of China Dec. 15, 2019, with English abstract.
Choi, Sumin, et.al., "Design of Crosstalk Compensation Passive Equalizers for High-speed Differential Signaling on 2.5D-IC Interposer", Electrical Design of Advanced Packaging & Systems Symposium, Jan. 27, 2014, pp. 1-4.

* cited by examiner

SELF-CORRECTING CIRCUIT AND SIGNAL SELF-CORRECTING METHOD

This application claims priority to Chinese Patent Application No. 202111416834.7, filed on Nov. 26, 2021 in China National Intellectual Property Administration and entitled "SELF-CORRECTING CIRCUIT AND SIGNAL SELF-CORRECTING METHOD", which is hereby incorporated by reference in its entirety.

FIELD

The present application relates to the technical field of signal transmission, and in particular, to a self-correcting circuit and a signal self-correcting method.

BACKGROUND

High-speed serial signals are now widely used in various fields such as communications and Information Technology (IT) for stable and reliable signal transmission. According to different frequencies and different encoding methods, the high-speed serial signals may be divided into Peripheral Component Interconnect Express (PCIE), Statistical Analysis System (SAS), Serial Advanced Technology Attachment (SATA), and other high-speed signals. However, they are all composed of two signal lines P and N. P and N are two signals that are equal in magnitude and have opposite directions. When differential logical operation is performed on a signal of this structure at a receiving end, a same crosstalk on P and N during transmission may be eliminated, which lays a foundation for reliable signal transmission.

However, in an actual signal transmission process, a surrounding environment of an entire link is relatively complex. Even if P and N have close paths and distances, the two signal lines P and N may not sense a same crosstalk of the surrounding environment, and may even be interfered by signals with opposite crosstalk directions. This type of crosstalk is referred to as asymmetric crosstalk. When P and N are transmitted to a receiver again, crosstalk on the two signals may not be eliminated when the receiver performs differential operation, and opposite logical operation results may even be caused, thus obtaining error character results.

In an existing technology, after a chip detects signals of asymmetric crosstalk and generates error character bits, the chip will discard the error character bits and enable a sending end to send data again. FIG. 1 shows a structural block diagram of an existing design scheme, resulting low transmission efficiency in the end.

SUMMARY

In view of this, embodiments of the present application provide a self-correcting circuit and a signal self-correcting method, so as to solve the problem of low signal transmission efficiency.

According to one or more embodiments of the present application, a self-correcting circuit is provided. The circuit includes a calculation unit, a correcting unit, and a first transistor; an output end of the calculation unit is connected to an input end of the correcting unit; an output end of the correcting unit is connected to the first transistor;

the calculation unit is configured to calculate a voltage difference between a P signal and an N signal; and
the correcting unit is configured to correct, according to the voltage difference, an interference signal corresponding to the N signal, control the first transistor to be turned on, and output the corrected N signal through the first transistor.

According to the self-correcting circuit provided by the implementation of the present application, the voltage difference between the P signal and the N signal is calculated through the calculation unit: the interference signal corresponding to the N signal is corrected using the correcting unit according to the voltage difference, and the first transistor is controlled to be turned on; and the corrected N signal is output through the first transistor. Thus, the interference signal on the corrected N signal is symmetrical to an interference signal on the P signal, whereby the interference signals on the P signal and N signal may be eliminated when the receiving end performs differential logical operation, which lays a foundation for reliable signal transmission. After the above self-correcting circuit corrects the N signal, no error characters will be generated, so there is no need to discard error character bits, and a sending end is enabled to send data again, thereby improving the signal transmission efficiency.

According to one or more embodiments of the present application, the calculation unit includes a first calculation subunit and a diode: an output end of the first calculation subunit is connected to an input end of the diode; and
the first calculation subunit is configured to calculate the voltage difference between the P signal and the N signal, and transmit the voltage difference to the correcting unit through the diode when the voltage difference is greater than 0.

According to the self-correcting circuit provided by the implementation of the present application, the voltage difference between the P signal and the N signal is calculated using the first calculation subunit, and the voltage difference is transmitted to the correcting unit through the diode when the voltage difference is greater than 0, whereby the correcting unit may correct the N signal to ensure that the N signal and the P signal are subjected to the same interference signal.

According to one or more embodiments of the present application, the calculation unit further includes a second calculation subunit: an input end of the second calculation subunit is connected to an output end of the diode: an output end of the second calculation subunit is connected to the correcting unit:
the first calculation subunit transmits the voltage difference to the second calculation subunit through the diode when the voltage difference is greater than 0; and
the second calculation subunit is configured to calculate an interference difference between the P signal and the N signal on a basis of the voltage difference, whereby the correcting unit corrects, according to the interference difference, the interference signal corresponding to the N signal.

According to the self-correcting circuit provided by the implementation of the present application, when the voltage difference is greater than 0, the voltage difference is transmitted to the second calculation subunit through the diode, whereby the second calculation subunit may calculate the interference difference between the P signal and the N signal on the basis of the voltage difference, and the self-correcting circuit may determine a size of the interference difference and decide to correct the N signal according to the size of the interference difference.

According to one or more embodiments of the present application, one branch of the output end of the second calculation subunit is connected to the correcting unit; and the second calculation subunit is further configured to transmit the interference difference to the correcting unit when the interference difference exceeds a preset difference threshold.

According to the self-correcting circuit provided by the implementation of the present application, the second calculation subunit transmits the interference difference to the correcting unit when the interference difference exceeds the preset difference threshold, whereby it may be ensured that when the interference difference between the N signal and the P signal is large, the N signal may be accurately corrected.

According to one or more embodiments of the present application, the circuit further includes a NOT gate; another branch of the output end of the second calculation subunit is connected to the NOT gate; and
the NOT gate is configured to be turned on when the interference difference is less than or equal to the preset difference threshold, and the N signal is output through the NOT gate.

According to the self-correcting circuit provided by the implementation of the present application, when the interference difference is less than or equal to the preset difference threshold, the NOT gate is turned on to output the N signal, whereby when the interference difference between the N signal and the P signal is small, the N signal is not corrected. Thus, the efficiency for correcting the N signal may be improved.

According to one or more embodiments of the present application, the circuit further includes a second transistor; one end of the second transistor is connected to the NOT gate; another end of the second transistor is connected to an output end of the N signal; and
in a case that the NOT gate is turned on, the second transistor is turned on, and the N signal is output through the second transistor.

According to the self-correcting circuit provided by the implementation of the present application, in a case that the NOT gate is turned on, the second transistor is turned on. The N signal is output through the second transistor, which may ensure that the output N signal is accurate.

According to one or more embodiments of the present application, the correcting unit includes a first integrated operational amplifier and a first power supply module;
one branch of a positive input end of the first integrated operational amplifier is connected to the output end of the second calculation subunit, and another branch is connected to the output end of the N signal; and
one branch of a negative input end of the first integrated operational amplifier is connected to a grounding end of the first power supply module, and another branch is connected to an output end of the first integrated operational amplifier through a resistor.

According to the self-correcting circuit provided by the implementation of the present application, the correcting unit may use a connection relationship of the first integrated operational amplifier to correct the N signal according to an interference error between the N signal and the P signal and the N signal, whereby the interference signal of the corrected N signal and the interference signal of the P signal are symmetrical.

According to one or more embodiments of the present application the first calculation subunit includes a second integrated operational amplifier;
a positive input end of the second integrated operational amplifier is connected to an output end of the P signal; and
a negative input end of the second integrated operational amplifier is connected to the output end of the N signal.

According to the self-correcting circuit provided by the implementation of the present application, the first calculation subunit may use a connection relationship of the second integrated operational amplifier to accurately calculate the voltage difference between the P signal and the N signal, whereby the correcting circuit may correct the N signal according to the voltage difference between the P signal and the N signal.

According to one or more embodiments of the present application, the second calculation subunit includes a third integrated operational amplifier and a second power supply module;
a positive input end of the third integrated operational amplifier is connected to the output end of the first calculation subunit;
a negative input end of the third integrated operational amplifier is connected to a voltage output end of the second power supply module; and
an output end of the third integrated operational amplifier is connected to the input end of the correcting unit.

According to the self-correcting circuit provided by the implementation of the present application, the second calculation subunit may use a connection relationship of the third integrated operational amplifier to accurately calculate the interference difference between the P signal and the N signal, and output the interference difference to the correcting unit, whereby the correcting unit may accurately calculate the interference difference between the P signal and the N signal to correct the N signal.

According to one or more embodiments of the present application, the circuit further includes a first connection end; the first connection end is connected to the output end of the P signal; and
the first connection end is configured to output the P signal, so as to compare the P signal with the corrected N signal.

According to the self-correcting circuit provided by the implementation of the present application, the P signal is output through the first connection end, whereby the P signal may be compared with the corrected N signal, and the interference signals on the P signal and the N signal may be eliminated when the receiving end performs the differential logical operation, which lays a foundation for reliable signal transmission.

According to one or more embodiments of the present application, a signal self-correcting method is provided. The method is applied to a self-correcting circuit; the self-correcting circuit includes a calculation unit, a correcting unit, and a first transistor; an output end of the calculation unit is connected to an input end of the correcting unit; an output end of the correcting unit is connected to the first transistor; the method includes:
calculating a voltage difference between a P signal and an N signal; and
correcting, according to the voltage difference, an interference signal corresponding to the N signal, controlling the first transistor to be turned on, and outputting the corrected N signal through the first transistor.

According to one or more embodiments of the present application, the correcting, according to the voltage difference, an interference signal corresponding to the N signal includes: when the voltage difference is greater than 0, calculating an interference difference between the P signal and the N signal on the basis of the voltage difference; and correcting, according to the interference difference, the interference signal corresponding to the N signal.

According to one or more embodiments of the present application, the correcting, according to the interference difference, the interference signal corresponding to the N signal includes: when the interference difference is greater than a preset difference threshold, correcting, according to the interference difference, the interference signal corresponding to the N signal.

According to the self-correcting method provided by the implementation of the present application, the voltage difference between the P signal and the N signal is calculated; the interference signal corresponding to the N signal is corrected according to the voltage difference, and the first transistor is controlled to be turned on; and the corrected N signal is output through the first transistor. Thus, the interference signal on the corrected N signal is symmetrical to an interference signal on the P signal, whereby the interference signals on the P signal and N signal may be eliminated when the receiving end performs differential logical operation, which lays a foundation for reliable signal transmission. After the above self-correcting circuit corrects the N signal, no error characters will be generated, so there is no need to discard error character bits, and a sending end is enabled to send data again, thereby improving the signal transmission efficiency.

BRIEF DESCRIPTION OF THE DRAWINGS

Referring to the accompanying drawings, the features and advantages of the present application will be more clearly understood. The accompanying drawings are illustrative and should not be construed as imposing any limitations on the present application. In the accompanying drawings.

Figure 1:
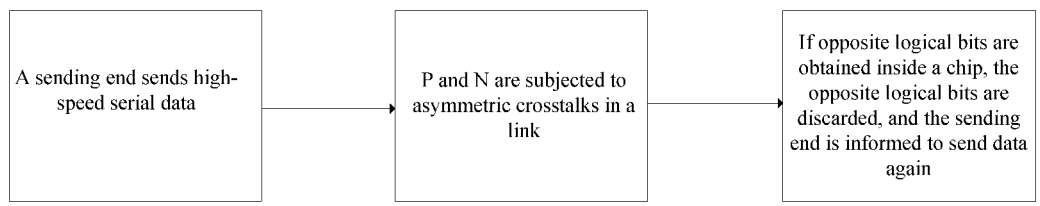
FIG. 1 shows a structural block diagram of an existing design scheme in one embodiment.

REFERENCE NUMERALS IN THE DRAWINGS calculation unit 01;
correcting unit 02;
first transistor 03;
NOT gate 04;
second transistor 05;
first connection end;
first calculation subunit 011;
second integrated operational amplifier 0111;
diode 012;
second calculation subunit 013;
third integrated operational amplifier 0131;
second power supply module 0132;
first integrated operational amplifier 021; and
first power supply module 022.

DETAILED DESCRIPTION

In order to make objectives, technical schemes and advantages of the embodiments of the present application clearer, technical schemes in the embodiments of the present application will be described clearly and completely below in combination with drawings in the embodiments of the present application. Apparently, the embodiments described are part of the embodiments of the present application, not all the embodiments. Based on the embodiments in the present application, all other embodiments obtained by those skilled in the art without creative labor shall fall within protection scope of the present application.

Serial numbers of components herein, such as "first" and "second" are used to distinguish described objects and do not have any order or technical meaning. Terms "connection" and "coupling" mentioned in the present application, unless otherwise specified, include both direct and indirect connections (couplings). In description of the present application, it should be understood that orientations or positional relationships indicated by terms "upper", "lower", "front", "rear", "left", "right", "vertical", "horizontal", "top", "bottom", "inside", "outside", "clockwise", "anticlockwise", and the like are orientations or positional relationships as shown in the drawings, and are for a purpose of facilitating and simplifying the description of the present application instead of indicating or implying that devices or elements indicated have particular orientations, and be constructed and operated in the particular orientations, whereby these terms are not construed as limiting the present application.

In the present application, unless otherwise specified and limited, a first feature being "above" or "below" a second feature may be direct contact between the first feature and the second feature, or that the first feature is in indirect contact with the second feature through an intermediate. Moreover, the first feature being "on", "above", and "over" the second feature may be that the first feature is right above or obliquely above the second feature, or represents that a level of the first feature is higher than that of the second feature. The first feature being "below", "under", and "beneath" the second feature may be that the first feature is directly below and obliquely below the second feature, or simply means that a level of the first feature is lower than that of the second feature.

Figure 2:
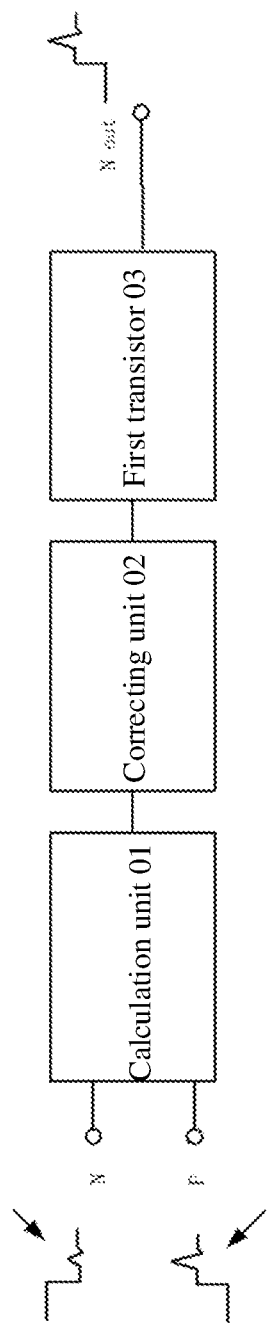
FIG. 2 shows a schematic structural diagram of a self-correcting circuit in one embodiment.

According to one or more embodiments of the present application, a self-correcting circuit is provided. As shown in FIG. 2, the circuit includes a calculation unit 01, a correcting unit 02, and a first transistor 03. An output end of the calculation unit 01 is connected to an input end of the correcting unit 02. An output end of the correcting unit 02 is connected to the first transistor 03.

The calculation unit 01 is configured to calculate a voltage difference between a P signal and an N signal. The correcting unit 02 is configured to correct, according to the voltage difference, an interference signal corresponding to the N signal, control the first transistor 03 to be turned on, and output the corrected N signal through the first transistor 03.

According to one or more embodiments of the present application, an input end of the calculation unit 01 may be connected to an output end of the P signal and an output end of the N signal, respectively, whereby the calculation unit 01 may receive the P signal and N signal. Then, the calculation unit 01 calculates the voltage difference between the P signal and the N signal on a basis of the received P signal and N signal.

According to one or more embodiments of the present application, the calculation unit 01 may directly subtract the N signal by the P signal to obtain the voltage difference between the P signal and the N signal.

Then, the calculation unit 01 inputs the calculated voltage difference between the P signal and the N signal to the correcting unit 02. The correcting unit 02 may correct the N signal on a basis of the voltage difference between the received P signal and N signal. Then, the first transistor 03 is controlled to be turned on, and the corrected N signal is output through the first transistor 03.

According to the self-correcting circuit provided by implementations of the present application, the voltage difference between the P signal and the N signal is calculated through the calculation unit 01, and then the interference signal corresponding to the N signal is corrected using the correcting unit according to the voltage difference, and the first transistor 03 is controlled to be turned on, and the corrected N signal is output through the first transistor 03. Thus, the interference signal on the corrected N signal is symmetrical to an interference signal on the P signal, whereby the interference signals on the P signal and N signal may be eliminated when a receiving end performs differential logical operation, which lays a foundation for reliable signal transmission. After above self-correcting circuit corrects the N signal, no error characters will be generated, so there is no need to discard error character bits, and a sending end is enabled to send data again, thereby improving signal transmission efficiency.

Figure 3:
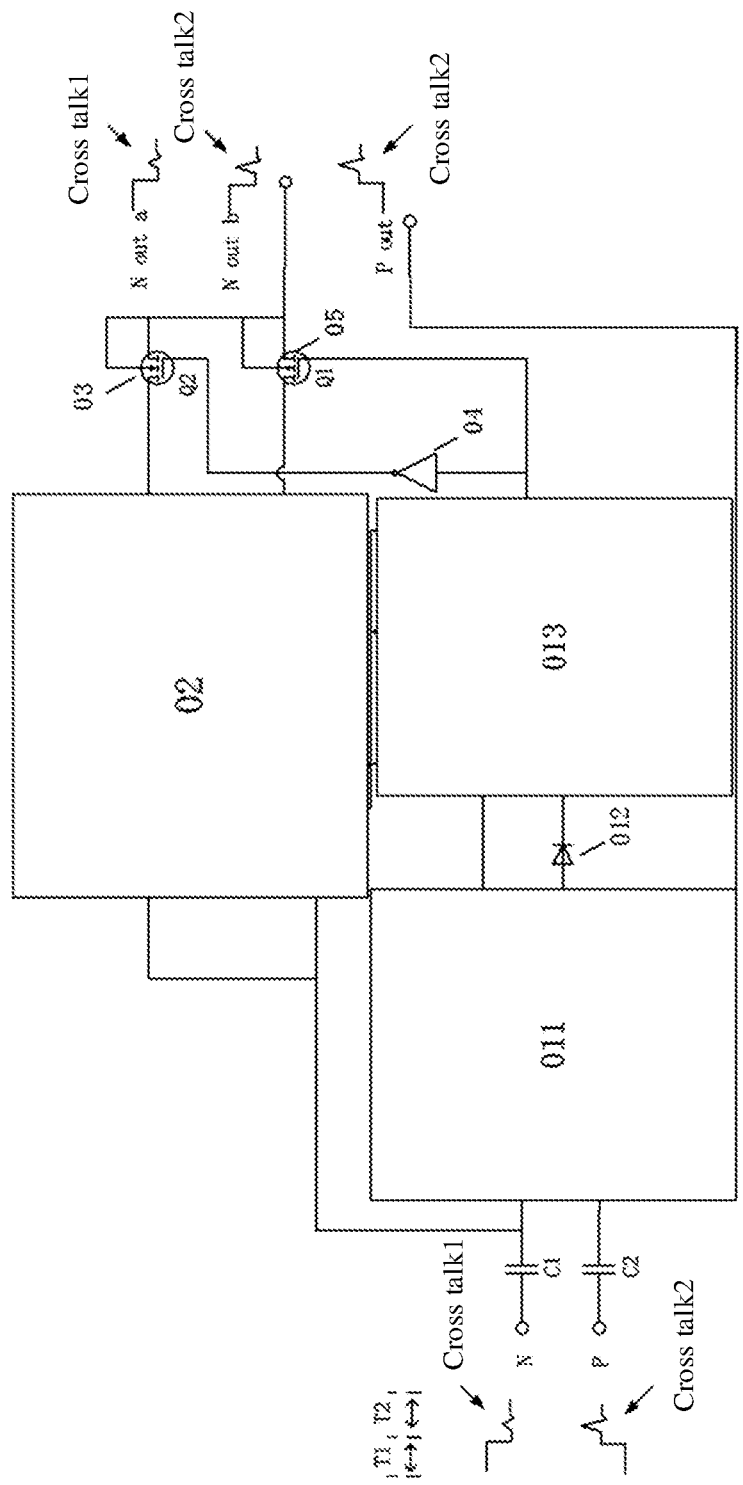
FIG. 3 shows a schematic structural diagram of a self-correcting circuit in another embodiment.

In one or more embodiments of the present application, the self-correcting circuit is provided. As shown in FIG. 3, the calculation unit 01 includes: a first calculation subunit 011 and a diode 012. An output end of the first calculation subunit 011 is connected to an input end of the diode 012. The calculation unit 01 further includes a second calculation subunit 013. An input end of the second calculation subunit 013 is connected to an output end of the diode 012.

The first calculation subunit 011 is configured to calculate the voltage difference between the P signal and the N signal, and transmit the voltage difference to the correcting unit 02 through the diode 012 when the voltage difference is greater than 0.

According to one or more embodiments of the present application, an input end of the first calculation subunit 011 may be connected to the output end of the P signal and the output end of the N signal, respectively, whereby the first calculation subunit 011 may receive the P signal and N signal. Then, the first calculation subunit 011 calculates the voltage difference between the P signal and the N signal on a basis of the received P signal and N signal.

According to one or more embodiments of the present application, the first calculation subunit 011 may directly subtract the N signal by the P signal to obtain the voltage difference between the P signal and the N signal.

The first calculation subunit 011 turns on the diode 012 when the voltage difference is greater than 0, and transmits the voltage difference to the second calculation subunit 013 through the diode 012.

The second calculation subunit 013 is configured to calculate the interference difference between the P signal and the N signal on the basis of the voltage difference.

According to one or more embodiments of the present application, when the voltage difference, calculated by the first calculation subunit 011, between the P signal and the N signal is greater than 0, the diode 012 is turned on, and the voltage difference is transmitted to the second calculation subunit 013 through the diode 012.

Then, the second calculation subunit 013 calculates the interference difference between the P signal and the N signal on the basis of the voltage difference.

According to one or more embodiments of the present application, the second calculation subunit 013 may calculate the interference difference between the P signal and the N signal by subtracting voltage amplitudes of the P signal and the N signal from the voltage difference.

In an implementation of the present application, one branch of an output end of the second calculation subunit 013 is connected to the correcting unit 02, and another branch of the output end of the second calculation subunit 013 is connected to a NOT gate 04.

The second calculation subunit 013 is further configured to transmit the interference difference to the correcting unit 02 when the interference difference exceeds a preset difference threshold.

The NOT gate 04 is configured to be turned on when the interference difference is less than or equal to the preset difference threshold, and the N signal is output through the NOT gate 04.

According to one or more embodiments of the present application, one branch of the output end of the second calculation subunit 013 is connected to the correcting unit 02, and another branch of the output end of the second calculation subunit 013 is connected to the NOT gate 04. When the interference difference between the P signal and the N signal is greater than the preset difference threshold, it indicates that the interference difference between the P signal and the N signal is significant and may not be ignored. An input of the NOT gate 04 is 1, and an output of the NOT gate 04 is 0. In this point, the second calculation subunit 013 transmits the interference difference to the correcting unit 02. When the interference difference between the P signal and the N signal is less than or equal to the preset difference threshold, it indicates that the interference difference between the P signal and the N signal is very small and may be ignored, which will not affect signal detection. In this point, the second calculation subunit 013 outputs the N signal through the NOT gate 04.

In one or more embodiments, the circuit further includes a second transistor 05. One end of the second transistor 05 is connected to the NOT gate 04, and another end of the second transistor 05 is connected to the output end of the N signal. In a case that the NOT gate 04 is turned on, the second transistor 05 is turned on, and the N signal is output through the second transistor 05.

According to the self-correcting circuit provided by the present application, the first calculation subunit 011 is configured to calculate the voltage difference between the P signal and the N signal, and transmit the voltage difference to the second calculation subunit 013 through the diode 012 when the voltage difference is greater than 0. The second calculation subunit 013 may calculate the interference difference between the P signal and the N signal on the basis of the voltage difference, and transmit the interference difference to the correcting unit 02 when the interference difference is greater than the preset difference threshold. The NOT gate 04 is turned on when the interference difference is less than or equal to the preset difference threshold, and the N signal is output through the NOT gate 04. This not only completes the correction of the N signal, but also improves the efficiency for correcting the N signal.

Figure 4:
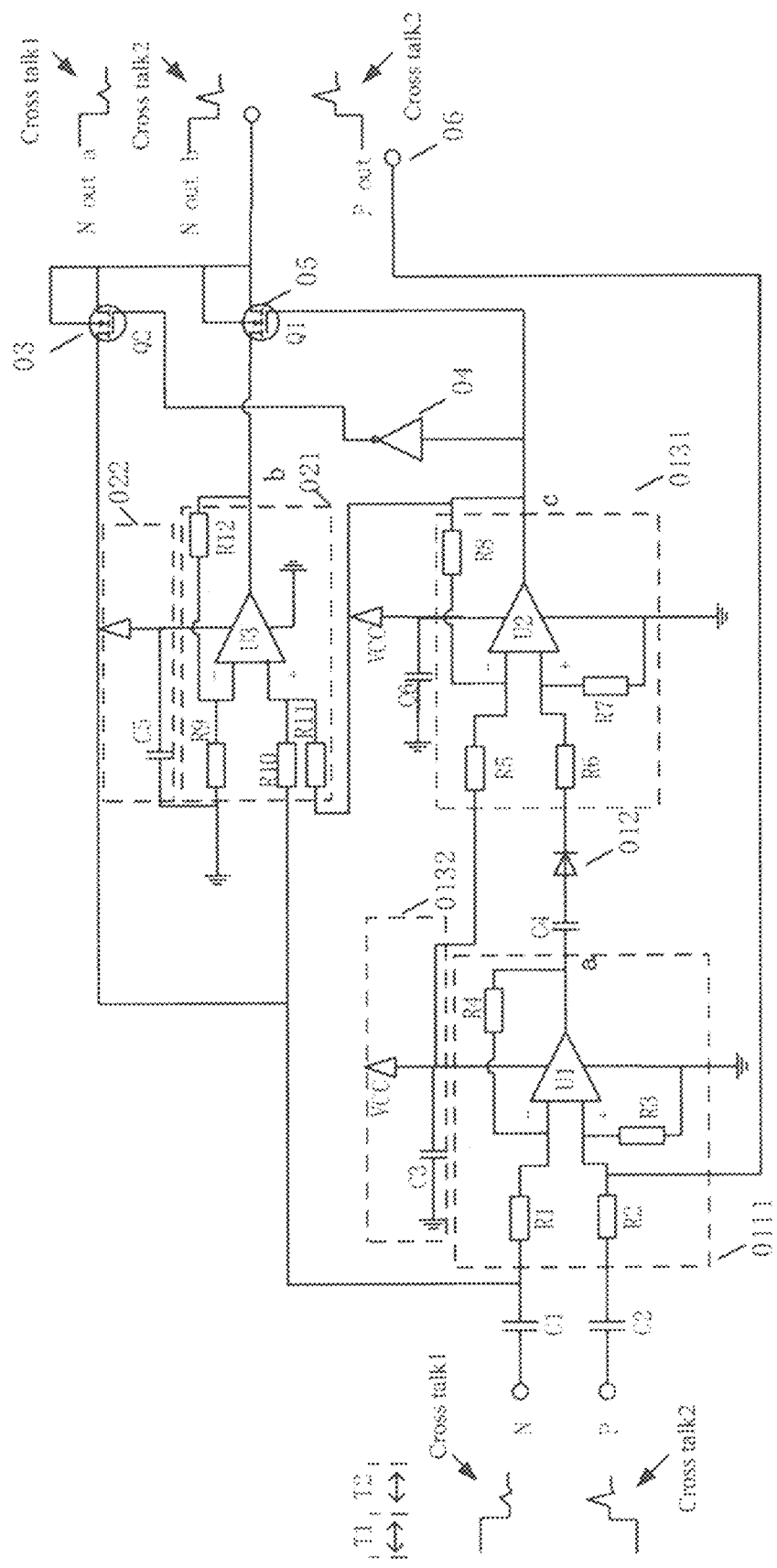
FIG. 4 shows a schematic structural diagram of a self-correcting circuit in another embodiment.

In one or more implementations of the self-correcting circuit provided in the present application, as shown in FIG. 4, the first calculation subunit 011 includes a second integrated operational amplifier 0111. A positive input end of the second integrated operational amplifier 0111 is connected to the output end of the P signal, and a negative input end of the second integrated operational amplifier 0111 is connected to the output end of the N signal.

According to one or more embodiments of the present application, the output end of the N signal may be connected to one branch of the negative input end of the second integrated operational amplifier 0111 through a first capacitor C1 and a first resistor R1. The output end of the P signal may be connected to one branch of the positive input end of the second integrated operational amplifier 0111 through a second capacitor C2 and a second resistor R2. The first capacitor C1 and the second capacitor C2 are input blocking capacitors configured to filter out a direct-current bias voltage on the P signal and N signal, ensuring that there is no additional direct-current voltage influence in an input.

Another branch of the positive input end of the second integrated operational amplifier 0111 is connected to a grounding end of a second power supply module through a third resistor R3. A power end of the third power supply module is connected to the grounding end through a capacitor C3.

Another branch of the negative input end of the second integrated operational amplifier 0111 is connected to an output end of the second integrated operational amplifier 0111 through a fourth resistor R4.

As a feedback resistor is connected to a reverse input end of the second integrated operational amplifier 0111, the second integrated operational amplifier 0111 has the properties of virtual short circuit and virtual broken circuit. Therefore, there is $U1^+=U1^-$. Further, according to property of virtual broken circuit, currents at both a forward input end and a reverse input end of U1 are 0, meaning that a current in the first resistor R1 is equal to a current in the fourth resistor R4, and a current in the second resistor R2 is equal to a current in the third resistor R3. From this, an output of U1 may be obtained:

$$a = \frac{(R1+R4)}{R1}\left(U_p * \frac{R3}{R2+R3} - U_n * \frac{R4}{R1+R4}\right).$$

According to this formula, the voltage difference between the P signal and the N signal may be calculated.

According to one or more embodiments of the present application, the output end of the second integrated operational amplifier 0111 may be connected to the input end of the diode 012 through a fourth capacitor C4, where the fourth capacitor C4 is a blocking capacitor for an output signal of the second integrated operational amplifier 0111.

In one or more implementations of the present application, the second calculation subunit 013 includes a third integrated operational amplifier 0131 and a second power supply module 0132. A power end of the second power supply module 0132 is connected to the grounding end through the third capacitor C3.

A positive input end of the third integrated operational amplifier 0131 is connected to the output end of the first calculation subunit 011.

A negative input end of the third integrated operational amplifier 0131 is connected to a voltage output end of the second power supply module 0132.

According to one or more embodiments of the present application, one branch of the negative input end of the third integrated operational amplifier 0131 is connected to the voltage output end of the second power supply module 0132 through a fifth resistor R5. One branch of the positive input end of the third integrated operational amplifier 0131 is connected to the output end of the diode 012 through a sixth resistor R6, and another branch is connected to a grounding end of the third power supply module through a seventh resistor R7. An output end of the third integrated operational amplifier 0131 is connected to another branch of the negative input end of the third integrated operational amplifier 0131 through an eighth resistor R8.

Similar to the characteristics of the second integrated operational amplifier 0111 mentioned above, as a feedback resistor is connected to a reverse input end of the third integrated operational amplifier 0131, the third integrated operational amplifier 0131 has the properties of virtual short circuit and virtual broken circuit. Therefore, an output of the third integrated operational amplifier 0131 may be obtained:

$$c = \frac{(R5+R8)}{R5}\left(a * \frac{R7}{R6+R7} - Vcc * \frac{R8}{R5+R8}\right).$$

According to this formula, the interference difference between the P signal and the N signal may be calculated.

In an implementation of the present application, the correcting unit 02 includes a first integrated operational amplifier 021 and a first power supply module 022. A power end of the first power supply module 022 is connected to the grounding end through a capacitor.

One branch of a positive input end of the first integrated operational amplifier 021 is connected to the output end of the second calculation subunit 013, and another branch is connected to the output end of the N signal.

One branch of a negative input end of the first integrated operational amplifier 021 is connected to a grounding end of the first power supply module 022, and another branch is connected to an output end of the first integrated operational amplifier 021 through a resistor.

According to one or more embodiments of the present application, one branch of the negative input end of the first integrated operational amplifier 021 is connected to the grounding end of the first power supply module 022 through a ninth resistor R9. One branch of the positive input end of the first integrated operational amplifier 021 is connected to the output end of the N signal through a tenth resistor R10, and another branch is connected to the output end of the third integrated operational amplifier 0131 through an eleventh resistor R11. An output end of the first integrated operational amplifier 021 is connected to another branch of the negative input end of the first integrated operational amplifier 021 through a twelfth resistor R12.

Based on characteristics of the third integrated operational amplifier 0131 and the second integrated operational amplifier 0111 mentioned above, as a feedback resistor is connected to a reverse input end of the first integrated operational amplifier 021, the first integrated operational amplifier 021 has the properties of virtual short circuit and virtual broken circuit. Therefore, an output of the first integrated operational amplifier 021 may be obtained:

$$b = \frac{(R9+R12)}{R9}\left(\frac{(U_n + U_{Cross\ talk1}) * R11 + C * R10}{R10+R11}\right).$$

According to this formula, the N signal may be corrected, whereby the interference signal on the N signal and the interference signal on the P signal are symmetrical.

In order to better understand the self-correcting circuit provided in the embodiments of the present application, referring to FIG. 3, FIG. 3 is taken as an example for description.

In this high-speed serial link, a P signal and an N signal are two signal lines of high-speed signals, with a signal amplitude of VCC. A crosstalk Cross talk2 on the P signal line is greater than a crosstalk Cross talk1 on the N signal. There is clearly a peak crosstalk greater than that of N on the P signal. In this case, the crosstalks on the P signal and the N signal are asymmetric. This may affect logical errors in a differential operation at a receiving end. In FIG. 3, N_out_a means that a waveform is exactly the same as that of the input N signal; and N_out_b means that a crosstalk on an output waveform has been corrected, which is as large as the crosstalk on the P signal and is also referred to as Cross talk2.

At time T1, the N signal is at a high level VCC, and the P signal is at a low level 0. In this case, there is no crosstalk in the signals. As a feedback resistor is connected to a reverse input end of a second integrated operational amplifier U1, the second integrated operational amplifier U1 has the properties of virtual short circuit and virtual broken circuit. Therefore, there is U1⁺=U1⁻. Further, according to the property of virtual broken circuit, currents at both a forward input end and the reverse input end of U1 are 0, meaning that a current in a first resistor R1 is equal to a current in a fourth resistor R4, and a current in R2 is equal to a current in R3. According to the above, an output of U1 may be obtained:

$$a = \frac{(R1+R4)}{R1}\left(U_p * \frac{R3}{R2+R3} - U_n * \frac{R4}{R1+R4}\right).$$

If R1=R2=R3=R4, the output of U1 is a=Up−Un. Therefore, a is a negative value. A diode connected to the output of the second integrated operational amplifier U1 is turned off. Therefore, a third integrated operational amplifier U2 has no input, and an output of the third integrated operational amplifier U2 is c=0. As an output end of the third integrated operational amplifier U2 is connected to a NOT gate 04, a gate level voltage of a second transistor Q2 is VCC. Therefore, the second transistor Q2 is turned on, and a first transistor Q1 is turned off. Therefore, an output of the N signal is N_out_a, which is the same as the input N signal. Pout is always equal to the input P. Therefore, at time T1, a PN output is consistent with a PN input, which does not affect the judgment of a differential signal receiving end.

At time T2, due to the influence of crosstalk, the crosstalk on the P signal is greater than the crosstalk on the N signal. The two crosstalks are asymmetric crosstalks. Similarly, there is a=Up−Un. As an amplitude of the P signal is VCC, and an amplitude of the N signal is 0, a=VCC+$U_{Cross\ talk2}$−$U_{Cross\ talk1}$. In this case, the diode 012 is turned on. Similarly, the third integrated operational amplifier U2 has the properties of virtual short circuit and virtual broken circuit, whereby an output of U2 may be obtained:

$$c = \frac{(R5+R8)}{R5}\left(a * \frac{R7}{R6+R7} - Vcc * \frac{R8}{R5+R8}\right).$$

In this case, if R5=R6=R7=R8, the output is c=a−Vcc+$U_{Cross\ talk2}$−$U_{Cross\ talk1}$. In this case, if c is very small, it means that the receiving end may accept this asymmetric crosstalk, without affecting the calculation of a final differential character, so there is no need to perform crosstalk correction. As c is very small, an output of a NOT gate Q3 is still 1. The second transistor Q2 is turned on, and the first transistor Q1 is turned off, so the output N signal is still N_out_a=$U_n$+$U_{Cross\ talk1}$. In this case, the asymmetric crosstalk is small, which will not affect the final judgment of the receiving end. If c is relatively large at this time, a gate level of the second transistor Q2 is 0. The second transistor Q2 is turned off, and the first transistor Q1 is turned on. Therefore, the output of N is output b of N_out_b=U3. A size of b may be obtained according to the virtual short circuit and virtual broken circuit properties of the first integrated operational amplifier U3:

$$b = \frac{(R9+R12)}{R9}\left(\frac{(U_n+U_{Cross\ talk1})*R11+C*R10}{R10+R11}\right).$$

If R9=R10=R11=R12, c is substituted in the formula, whereby b=Un+$U_{Cross\ talk2}$ may be obtained. Therefore, the output N signal is corrected, the crosstalk on which is the same as that on the P signal: Cross talk2. Therefore, the receiving end may completely eliminate the crosstalks on the P signal and the N signal through a differential subtraction operation and obtain a correct character bit.

The embodiments of the present application provide a signal self-correcting method. The method is applied to a self-correcting circuit; the self-correcting circuit includes a calculation unit, a correcting unit, and a first transistor; an output end of the calculation unit is connected to an input end of the correcting unit; an output end of the correcting unit is connected to the first transistor; the method includes:

101, calculating a voltage difference between a P signal and an N signal; and 102, correcting, according to the voltage difference, an interference signal corresponding to the N signal, controlling the first transistor to be turned on, and outputting the corrected N signal through the first transistor.

According to one or more embodiments of the present application, an input end of the self-correcting circuit may be connected to an output end of the P signal and an output end of the N signal, respectively, whereby the self-correcting circuit may receive the P signal and N signal. Then, the self-correcting circuit calculates the voltage difference between the P signal and the N signal on the basis of the received P signal and N signal.

According to one or more embodiments of the present application, the self-correcting circuit may directly subtract the N signal by the P signal to obtain the voltage difference between the P signal and the N signal.

Then, the self-correcting circuit corrects the N signal according to the calculated voltage difference between the P signal and the N signal. Then, the self-correcting circuit controls the first transistor to be turned and outputs the corrected N signal through the first transistor.

According to the self-correcting method provided by the implementation of the present application, the voltage difference between the P signal and the N signal is calculated; the interference signal corresponding to the N signal is corrected according to the voltage difference, and the first transistor is controlled to be turned on; and the corrected N signal is output through the first transistor. Thus, the interference signal on the corrected N signal is symmetrical to an interference signal on the P signal, whereby the interference signals on the P signal and N signal may be eliminated when the receiving end performs differential logical operation, which lays a foundation for reliable signal transmission. After the above self-correcting circuit corrects the N signal, no error characters will be generated, so there is no need to discard error character bits, and a sending end is enabled to send data again, thereby improving the signal transmission efficiency.

Although the embodiments of the present application are described in conjunction with the accompanying drawings, those skilled in the art may make various modifications and variations without departing from the spirit and scope of the present application. These modifications and variations fall within the scope defined by the accompanying claims.

The invention claimed is:

1. A self-correcting circuit, wherein the self-correcting circuit comprises a calculation unit, a correcting unit, a first transistor, a second transistor, and a NOT gate; the calculation unit comprises a first calculation subunit and a second calculation subunit; one end of the second transistor is connected to the NOT gate; a second end of the second transistor is connected to an output end of an N signal, a first branch of an output end of the second calculation subunit is connected to the correcting unit, a second branch of the output end of the second calculation subunit is connected to the NOT gate, a third branch of the output end of the second calculation subunit is connected to a first end of the first transistor, and an output end of the correcting unit is connected to a second end of the first transistor;

the first calculation subunit is configured to calculate a voltage difference between a P signal and the N signal, wherein crosstalks on the P signal and the N signal are asymmetric;

the second calculation subunit is configured to calculate an interference difference between the P signal and the N signal on a basis of the voltage difference;

in a case where the interference difference between the P signal and the N signal of the second calculation subunit exceeds a preset difference threshold, the second calculation subunit outputs the interference difference to the NOT gate through the second branch, closes the second transistor to avoid outputting the N signal through the second transistor, transmits the interference difference to the correcting unit through the first branch to correct an interference signal corresponding to the N signal, and transmits the interference difference to the first transistor through the third branch to control the first transistor to be turned on to output a corrected N signal through the first transistor; and in a case where the interference difference between the P signal and the N signal of the second calculation subunit is less than or equal to the preset difference threshold, the second calculation subunit outputs the interference difference to the NOT gate through the second branch to turn on the second transistor outputting the N signal through the second transistor, and the second calculation subunit transmits the interference difference to the first transistor through the third branch to control the first transistor to be turned off avoiding the first transistor outputting the N signal.

2. The self-correcting circuit according to claim 1, wherein the calculation unit comprises a diode; an output end of the first calculation subunit is connected to an input end of the diode; and the first calculation subunit is configured to transmit the voltage difference to the correcting unit through the diode in response to a determination that the voltage difference is greater than 0.

3. The self-correcting circuit according to claim 2, wherein an input end of the second calculation subunit is connected to an output end of the diode; and the first calculation subunit transmits the voltage difference to the second calculation subunit through the diode in response to the determination that the voltage difference is greater than 0.

4. The self-correcting circuit according to claim 3, wherein the second calculation subunit is configured to calculate the interference difference between the P signal and the N signal by subtracting voltage amplitudes of the P signal and the N signal from the voltage difference.

5. The self-correcting circuit according to claim 2, wherein the first calculation subunit comprises a second integrated operational amplifier;

a positive input end of the second integrated operational amplifier is connected to an output end of the P signal; and a negative input end of the second integrated operational amplifier is connected to an output end of the N signal.

6. The self-correcting circuit according to claim 5, wherein the self-correcting circuit further comprises a first capacitor, a first resistor, a second capacitor, and a second resistor;

the output end of the N signal is configured to be connected to one branch of the negative input end of the second integrated operational amplifier through the first capacitor and the first resistor; and the output end of the P signal is configured to be connected to one branch of the positive input end of the second integrated operational amplifier through the second capacitor and the second resistor.

7. The self-correcting circuit according to claim 6, wherein the first capacitor and the second capacitor are input blocking capacitors.

8. The self-correcting circuit according to claim 6, wherein the self-correcting circuit further comprises a third resistor, a fourth resistor, and a second power supply module;

a second branch of the positive input end of the second integrated operational amplifier is configured to be connected to a grounding end of the second power supply module through the third resistor; and a second branch of the negative input end of the second integrated operational amplifier is configured to be connected to an output end of the second integrated operational amplifier through the fourth resistor.

9. The self-correcting circuit according to claim 8, wherein a current in the first resistor is equal to a current in the fourth resistor, and a current in the second resistor is equal to a current in the third resistor.

10. The self-correcting circuit according to claim 5, wherein the self-correcting circuit further comprises a fourth capacitor, and an output end of the second integrated operational amplifier is configured to be connected to the input end of the diode through the fourth capacitor.

11. The self-correcting circuit according to claim 1, wherein the correcting unit comprises a first integrated operational amplifier and a first power supply module;

one branch of a positive input end of the first integrated operational amplifier is connected to the first branch of the output end of the second calculation subunit, and a second branch of the positive input end of the first integrated operational amplifier is connected to an output end of the N signal; and one branch of a negative input end of the first integrated operational amplifier is connected to a grounding end of the first power supply module, and a second branch of the negative input end of the first integrated operational amplifier is connected to an output end of the first integrated operational amplifier through a resistor.

12. The self-correcting circuit according to claim 11, wherein the self-correcting circuit further comprises a ninth resistor, a tenth resistor, an eleventh resistor, a twelfth resistor, and a third integrated operational amplifier;

the one branch of the negative input end of the first integrated operational amplifier is configured to be connected to the grounding end of the first power supply module through the ninth resistor;

the second branch of the negative input end of the first integrated operational amplifier is configured to be connected to the output end of the first integrated operational amplifier through the twelfth resistor;

the one branch of the positive input end of the first integrated operational amplifier is configured to be connected to the output end of the N signal through the tenth resistor; and the second branch of the positive input end of the first integrated operational amplifier is configured to be connected to an output end of the third integrated operational amplifier through the eleventh resistor.

13. The self-correcting circuit according to claim 1, wherein the second calculation subunit comprises a third integrated operational amplifier and a second power supply module;

a positive input end of the third integrated operational amplifier is connected to an output end of the first calculation subunit;

a negative input end of the third integrated operational amplifier is connected to a voltage output end of the second power supply module; and an output end of the third integrated operational amplifier is connected to an input end of the correcting unit.

14. The self-correcting circuit according to claim 13, wherein the self-correcting circuit further comprises a fifth resistor, a sixth resistor, a seventh resistor, an eighth resistor, and a third power supply module;

one branch of the negative input end of the third integrated operational amplifier is configured to be connected to the voltage output end of the second power supply module through the fifth resistor;

a second branch of the negative input end of the third integrated operational amplifier is configured to be connected to the output end of the third integrated operational amplifier through the eighth resistor;

one branch of the positive input end of the third integrated operational amplifier is configured to be connected to an output end of a diode of the calculation unit through the sixth resistor; and a second branch of the positive input end of the third integrated operational amplifier is configured to be connected to a grounding end of the third power supply module through the seventh resistor.

15. A signal self-correcting method, wherein the signal self-correcting method is applied to a self-correcting circuit; the self-correcting circuit comprises a calculation unit, a correcting unit, a first transistor, a second transistor, and a NOT gate; the calculation unit comprises a first calculation subunit and a second calculation subunit; one end of the second transistor is connected to the NOT gate; a second end of the second transistor is connected to an output end of an N signal, a first branch of an output end of the second calculation subunit is connected to the correcting unit, a second branch of the output end of the second calculation subunit is connected to the NOT gate, a third branch of the output end of the second calculation subunit is connected to a first end of the first transistor, and an output end of the correcting unit is connected to a second end of the first transistor; the signal self-correcting method comprises:

calculating, by the first calculation subunit, a voltage difference between a P signal and the N signal, wherein crosstalks on the P signal and the N signal are asymmetric;

calculating, by the second calculation subunit, an interference difference between the P signal and the N signal on a basis of the voltage difference;

in a case where the interference difference between the P signal and the N signal of the second calculation subunit exceeds a preset difference threshold, outputting, by the second calculation subunit, the interference difference to the NOT gate through the second branch, closing the second transistor to avoid outputting the N signal through the second transistor, transmitting the interference difference to the correcting unit through the first branch to correct an interference signal corresponding to the N signal, and transmitting the interference difference to the first transistor through the third branch to control the first transistor to be turned on to output a corrected N signal through the first transistor; and in a case where the interference difference between the P signal and the N signal of the second calculation subunit is less than or equal to the preset difference threshold, outputting, by the second calculation subunit, the interference difference to the NOT gate through the second branch to turn on the second transistor outputting the N signal through the second transistor, and transmitting, by the second calculation subunit, the interference difference to the first transistor through the third branch to control the first transistor to be turned off avoiding the first transistor outputting the N signal.

* * * * *